E. J. SWEETLAND.
FILTER.
APPLICATION FILED FEB. 2, 1917.
1,313,929.
Patented Aug. 26, 1919.
3 SHEETS—SHEET 1.
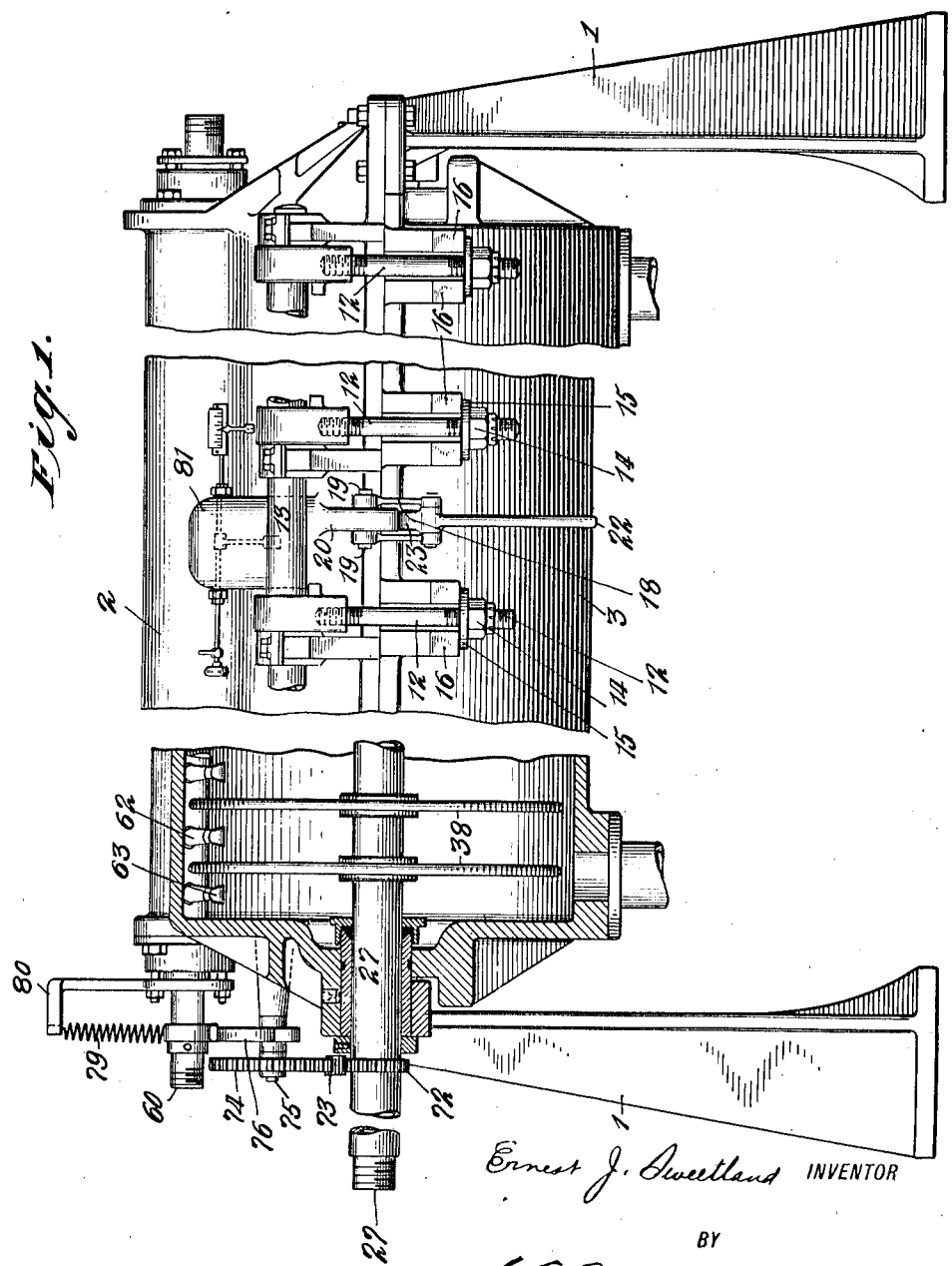

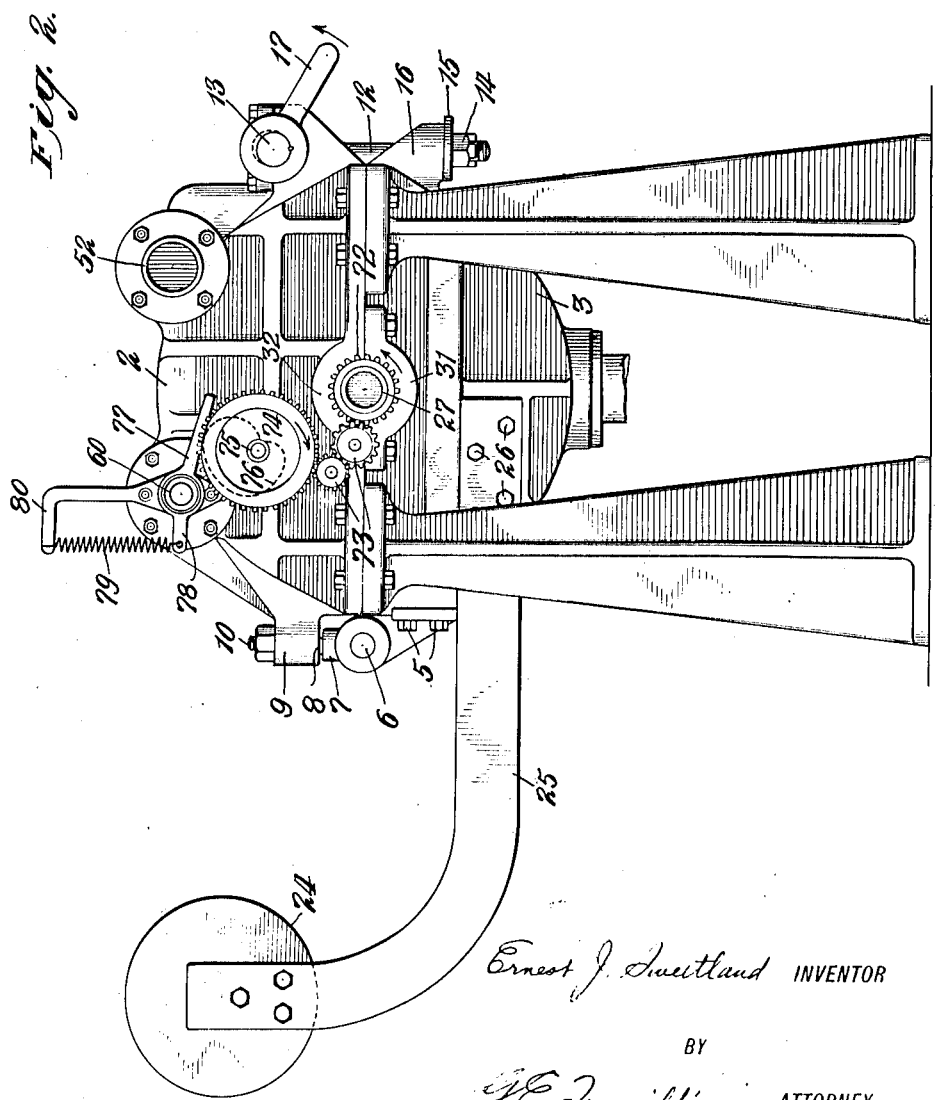

E. J. SWEETLAND.
FILTER.
APPLICATION FILED FEB. 2, 1917.
1,313,929.
Patented Aug. 26, 1919.
3 SHEETS—SHEET 3.
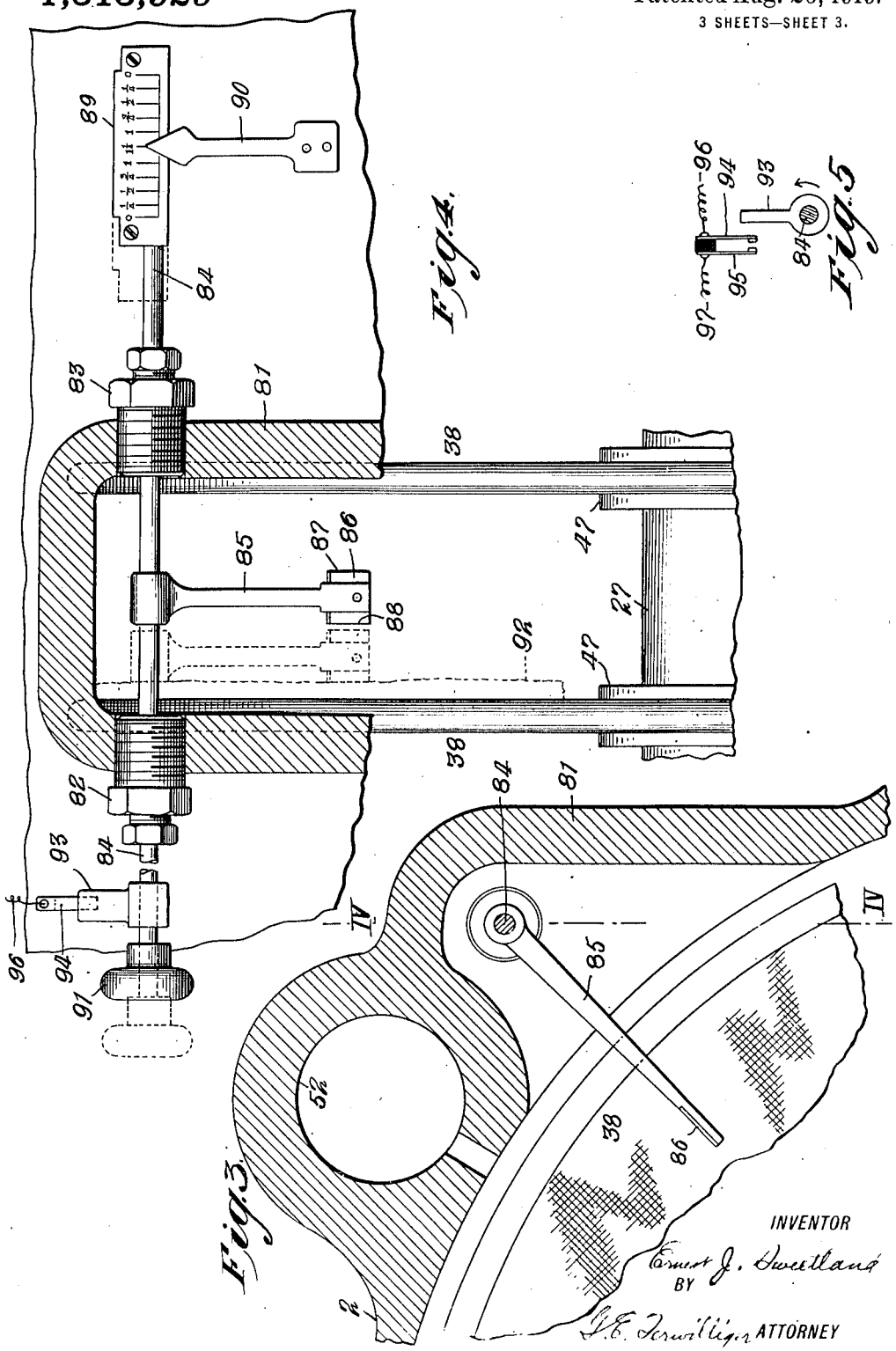
INVENTOR
Ernest J. Sweetland
BY
ATTORNEY

UNITED STATES PATENT OFFICE.

ERNEST J. SWEETLAND, OF MONTCLAIR, NEW JERSEY, ASSIGNOR, BY MESNE ASSIGNMENTS, TO UNITED FILTERS CORPORATION, A CORPORATION OF DELAWARE.

FILTER.

1,313,929.  Specification of Letters Patent.  Patented Aug. 26, 1919.

Application filed February 2, 1917. Serial No. 146,056.

*To all whom it may concern:*

Be it known that I, ERNEST J. SWEETLAND, a citizen of the United States, residing in the town of Montclair, county of Essex, and State of New Jersey, have invented certain new and useful Improvements in Filters, of which the following is a specification.

My invention relates broadly to filters of the pressure type, that is filters in which the material to be filtered is introduced into a closed compartment under pressure and finds its way out by passing through filter cloth or other filter material, upon which the solids are deposited in the form of a filter cake, while the clear liquid or filtrate is led away. Certain features of my invention are particularly applicable to a type of filter in which the filter elements or filter leaves are adapted to be moved relatively to the casing or containing tank, preferably by being mounted upon a central rotatable shaft which at once furnishes their support and also may act as a passage for the filtrate entering the leaves. One phase of my invention deals with means applicable to any filter having spaced leaves for determining the thickness of the cake which is building up on the surface of the leaf, and this means may preferably be adapted to give a manual indication or to sound an alarm when the thickness of the cake reaches a critical dimension.

In the accompanying drawings which form a part of this specification, Figure 1 is a side elevation, the parts being shown in central section for the purpose of clearness, of a filter embodying my invention; Fig. 2 is an end elevation looking at the lefthand of the filter of Fig. 1; Fig. 3 is a vertical fragmentary sectional view showing a portion of the filter and cake tester; Fig. 4 is a sectional view on line IV—IV of Fig. 3; Fig. 5 is a fragmentary view showing an electrical attachment for giving an alarm when the tester is actuated.

Referring to the drawings in detail, the numeral 1 designates posts or standards adapted to support the upper semi-cylindrical member 2 of the filter. The filter casing is completed by a lower semi-cylindrical member 3 which is preferably attached to the upper section along one side by means of a plurality of hinges 4. One leaf of each hinge is permanently secured to the lower section of the casing, as by means of the bolts 5, and is provided with an upwardly extending lug or boss centrally drilled for the reception of the pintle 6. The other leaf 7 of each hinge is adjustably secured to the upper section of the casing, preferably by means of an integral threaded stud 8 passing through a lug 9 and having its upper end 10 provided with a suitable nut 11, by which the stud and pintle may be vertically adjusted. This construction makes it possible to raise and lower the axis of the pintle of the hinge as may be necessary owing to wear in the gaskets (not shown) which provide a water-tight seal between the upper and the lower sections of the casing when they are clamped in operative position.

Along the opposite side of the filter is disposed a plurality of swing bolts 12 attached to a cam shaft 13 and having their lower extremities provided with nuts 14 and washers 15 adapted to engage lugs 16 projecting from the side of the lower section of the casing. A handle 17 is provided for turning the shaft 13 and thereby operating the swing bolts. The construction of the swing bolts and the cam shaft upon which they are mounted, by means of which the bolts automatically are moved longitudinally and then are swung out of engagement with the lugs 16 by the rotation of the shaft, is described and claimed in my United States Patent No. 1,083,305 and will not be here set forth in detail, as they form no part of my present invention. It will suffice to say that the turning of the handle 17 in the direction of the arrow in Fig. 2 first moves the bolts vertically downward until they are free from the lugs 16, and that further rotation of the handle then swings them to the right, out of engagement with the lugs, thus releasing that edge of the lower section of the casing from the upper section of the casing, except for an auxiliary clamp (see Fig. 1) consisting of links 18 pivotally secured at 19 to a lug 20 which may be integral with the upper section of the casing. The lower ends of the links are pivotally connected to a lever 21 provided at one end with a handle 22 and at the other with a locking arm 23 adapted to engage under the lower edge of the lug 20, as shown in Fig. 1, and thus clamp the upper and lower sections of the casing firmly together when the handle of the lever is pushed inwardly toward the filter body. To prevent the sudden dropping of the lower section of the casing when the swing bolts and locking device just described are released, I may provide the lower section of the casing with a counter-weight 24 mounted upon a curved arm 25 secured to the lower section of the casing in any suitable manner, as by means of bolts 26. This counter-weight is so proportioned that it just balances the weight of the lower section of the casing. The latter may thus be readily swung around the axis of the pintle 6 of the hinges either by hand or by other power means until it assumes a substantially vertical position. As stated above, suitable gaskets (not shown) are provided for maintaining a fluid-tight joint between the abutting edges of the upper and lower sections of the casing.

Centrally arranged with reference to the two filter sections is a longitudinal pipe or conduit 27 which is journaled at each end in suitable bearings 28 carried by the posts 1.

In the filter shown the central pipe 27 is provided with a plurality of filter leaves 38, which are rotatable therewith.

When the fluid to be filtered is introduced into the interior of the filter casing, as through the inlet manifold 52 (see Fig. 2), the only outlet for such liquid is through the filter leaves into the pipe 27. From the pipe 27 the filtrate is discharged into any suitable receptacle. The solid matter originally held in suspension in the liquid to be filtered cannot pass through the filter leaves, and is deposited on the outer surface of each leaf in the form of a layer of solid matter, which is known as the filter cake.

To wash the surfaces of the filter leaves when it is desired to free them from the deposit of filter cake that may have formed on them, I provide a sluicing manifold 60 which passes through suitable stuffing boxes at each end of the casing and is provided with sluicing pipes 62 preferably entering between each pair of filter leaves and terminating in suitable nozzles 63.

In order to cause the nozzle of each of the sluicing pipes to sweep across the surface of the filter leaves as the latter revolve within the casing, the manifold 60 is made rotatable within its stuffing box supports, and the means illustrated in Figs. 1 and 2 are provided for automatically causing it to oscillate. These means include a gear 72 mounted upon and moving with the pipe 27. This gear meshes with one of the idlers 73, the second of which drives the gear 74 keyed to the shaft 75 carrying a cam 76. This cam engages a cam follower 77 which is secured to the manifold 60 and drives it. The follower is also provided with an extending arm 78 to which is connected a spring 79 fixed at its other end to a standard 80. This spring acts to keep the follower constantly in engagement with the surface of the cam and to overcome any friction in the stuffing boxes. The cam is so designed as to cause a slow advance of the nozzles down across the face of the filter leaves, and then to produce a relatively quick return back to the initial position. It will be appreciated that the sluicing pipes do not cross the central pipe 27 but play across only half of the face of each leaf, but this is sufficient since the leaves themselves are meanwhile rotated. This does not constitute any part of the present invention which is claimed in this application, and is merely explanatory of the particular filter in connection with which the device for indicating the thickness of the cakes is shown.

In Figs. 3, 4 and 5 I have illustrated the details of the mechanism for testing the thickness of the cake or deposit of solid material forming upon the filter leaves, at some suitable point in the casing, preferably about midway along the upper section, a housing 81 in which are placed two axially alined stuffing boxes 82, 83 through which passes a rod 84. The portion of the rod which is within the housing carries a depending arm 85, the lower end of which may be provided with a testing piece 86 preferably formed of thin material with edges 87 and 88 parallel to the faces of the filter leaves 38 between which the arm 85 enters. One extending end of the rod 84 may be provided with a scale plate 89 playing in front of a fixed pointer 90, while the other end may be provided with an adjusting knob or handle 91. The scale is calibrated to indicate the distance of one of the edges 87 or 88 from the surface of the adjacent filter plate. It is therefore possible to set the device so that the pointer 90 will be over the figure indicating any desired thickness of cake, as, for instance, one-quarter inch. The arm 85 will then assume the position shown in dotted lines in Fig. 4 and the edge 88 will be a quarter of an inch away from the surface of the adjacent leaf. While the filter leaves continuously revolve in the solution which is to be filtered, the cake 92 gradually builds up on the surface and finally reaches such a thickness that it will contact with the edge 88 of the plate upon the arm 85. The continued rotation of the filter leaf and the cake carried by it will then displace the arm 85 through a considerable arc owing to the frictional engagement of the cake with the edge of the plate 86, and this will turn the rod 84, thus giving a visual indication to the operator that the cake has attained the thickness for which the tester has been set. In case an audible indication is desired, the arm 93 mounted upon the rod 84 may be so positioned that the turning of the rod will cause the arm to engage a movable electrical contact 94, causing it to touch a fixed contact 95 and close an electric circuit through the wires 96 and 97, which may thereby sound an alarm, light an electric light, or give other suitable signal, audible or visual, to the attendant.

In filters of the leaf type it is extremely important, where the cakes are to be washed, for the attendant to be able to determine just how thick the cake is at any time, so that he may be warned to discontinue filtration at such a time as to leave a suitable space between adjacent cakes to permit the entrance of wash water or other wash fluid. In the absence of a device of this sort there is danger of the space between adjacent filter leaves being filled solidly full of cake, so as to make it practically impossible to wash the cake evenly and efficiently.

Another important object in making it possible for the attendant to determine the thickness of the cake or to notify the attendant when the cake has reached the maximum allowable thickness, is to prevent damage to filters having rotatable leaves. Such damage might easily result if the machine became overcharged by continuing filtration to the point where the thickness of the cake grew excessive, since the accumulation of solid matter in the machine would eventually fill the filter casing solidly and thus create a great amount of friction between the rotating and stationary elements. This friction, if not checked, would be so great as to injure the leaves or the gaskets 54 encircling the central drainage pipe between the leaves unless the filter drive yielded, as by jumping off its pulley.

The device above described may be used in either of two ways; first, it may be set as indicated, with any desired mark on the scale opposite the pointer, and utilized merely to cause an alarm, either visual or audible, when the thickness of the cake reaches the point for which the scale has been set, or, second, the operator may utilize the device at any time during the progress of the filtration and cake-forming to determine the thickness of the cake on the filter element at that particular moment. This operation may be carried out by lightly adjusting the rod 84 longitudinally by means of the knob 91, until one of the edges 87, 88 comes in contact with the cake, at which point the drag of the surface of the cake upon the plate 86 will be readily felt by the operator.

While I have illustrated and described only certain specific embodiments of my invention, I realize that it is susceptible of wide adaptation and I do not desire to be limited to the precise construction shown and described nor to the application of certain of the features of my invention to filters of the rotary type, since they are equally applicable to many well-known types of filters Having thus disclosed my invention, I claim:

1. In a filter, a casing, a filter element movably mounted therein, and means for testing the thickness of filter cake forming upon said filter element including a device capable of oscillation about an axis, and a member adapted to engage the surface of a cake being formed and thereby to cause the oscillation of said device.

2. In a filter, a casing, a filter element movably mounted therein, and means for testing the thickness of filter cake forming upon said filter element including a device capable of oscillation about an axis, a member adapted to engage the surface of a cake being formed and thereby to cause the oscillation of said device, and means for producing an indication that such oscillation has occurred, at a point outside the casing.

3. In a filter, a casing, a filter element movably mounted therein, and means for testing the thickness of filter cake forming upon said filter element including a device capable of oscillation in a plane substantially parallel to the surface of the element, and a member adapted to engage the surface of a cake being formed and thereby to cause the oscillation of said device.

4. In a filter, a casing, a filter element movably mounted therein, and means for testing the thickness of filter cake forming upon said filter element including a device capable of oscillation in a plane substantially parallel to the surface of the element, and means for producing an indication that such oscillation has occurred, at a point outside the casing.

5. In a filter, a casing, a filter element movably mounted therein, and means for testing the thickness of filter cake forming upon said filter element including a rod piercing the casing and a device within the casing mounted upon said rod and adapted to engage the surface of a cake being formed and to be oscillated thereby about the axis of the rod.

6. In a filter, a casing, a filter element movably mounted therein, and means for testing the thickness of filter cake forming upon said filter element including a member piercing the casing and a device within the casing mounted upon said member and adapted to engage the surface of a cake being formed and to be oscillated thereby about the axis of the member, and means for longitudinally adjusting said member.

7. In a filter, a casing, a filter element movably mounted therein, and means for testing the thickness of filter cake forming upon said filter element including a member piercing the casing, a device within the casing mounted upon said member and adapted to engage the surface of a cake being formed and to be oscillated thereby about the axis of the member, means for longitudinally adjusting said member, and a scale associated with said member for indicating the distance of said device from the surface of the filter element.

8. In a filter, a casing, a filter element movably mounted therein, and means for testing the thickness of filter cake forming upon said filter element including a member piercing the casing and a device within the casing mounted upon said member and adapted to engage the surface of a cake being formed and to be oscillated thereby about the axis of the member, and an alarm adapted to be actuated by oscillation of said member.

9. In a filter, a casing, a filter element movably mounted therein, and means for testing the thickness of filter cake forming upon said filter element including a member piercing the casing and a device within the casing mounted upon said member and adapted to engage the surface of a cake being formed and to be oscillated thereby about the axis of the member, means for longitudinally adjusting said member, and an alarm adapted to be actuated by oscillation of said member.

10. In a filter, a casing, a filter element movably mounted therein, and means for testing the thickness of filter cake forming upon said filter element including a rod piercing the casing and a device within the casing mounted upon said rod and adapted to engage the surface of a cake being formed and to be oscillated thereby about the axis of the rod, means for longitudinally adjusting said rod, a scale associated with said rod for indicating the distance of said device from the surface of the filter element, and an alarm adapted to be actuated by oscillation of said rod.

11. The combination with a filter comprising a casing and a filter element mounted in said casing, of means for testing the thickness of filter cake forming upon said filter element including a rod extending into the filter casing, a laterally projecting arm connected to said rod within the filter casing and adapted to engage the surface of the cake formed on the filter element, means for longitudinally adjusting said rod and a scale carried by said rod exteriorly of the filter casing for indicating the distance of the said laterally projecting arm from the filter element.

12. The combination with a filter comprising a casing and a filter element rotatably mounted in said casing, of means for testing the thickness of filter cake formed on said filter element including a rod extending into said filter casing and rotatable and longitudinally movable therein, a laterally projecting arm rigidly connected to said rod within the filter casing and adapted to engage the filter cake formed on the filter element and to be oscillated thereby about the axis of the rod, means for longitudinally adjusting said rod, and a scale associated with the rod to indicate the distance of the laterally projecting arm from the filter element.

E. J. SWEETLAND.